United States Patent Office 3,230,186
Patented Jan. 18, 1966

3,230,186
SHOCK-RESISTANT POLYSTYRENE COMPOSITIONS CONTAINING TWO RUBBERY POLYMERS
Kurt Kreibich and Karl-Otto Hagel, Marl Kreis Recklinghausen, Germany, assignors to Chemische Werke Huls Aktiengesellschaft, Kreis Recklinghausen, Germany, a corporation of Germany
No Drawing. Filed Feb. 5, 1962, Ser. No. 171,784
Claims priority, application Germany, Feb. 6, 1961, C 23,346
1 Claim. (Cl. 260—4)

It is known that both natural and synthetic rubbers, for example, copolymers of diolefines like butadiene and vinyl-aromatic compounds like styrene can be added to polystyrene or styrene-containing copolymers. In this way tough thermoplasts which decrease in brittleness and sensitivity against sudden mechanical stress with increasing rubber content are obtained. But on the other hand, the resistance of these products to aging decreases with increasing rubber content, since rubber, due to its content of double bonds, becomes brittle under the influence of atmospheric oxygen and light, particularly at elevated temperatures. It is also known that polyolefines, like polyethylene, polypropylene, polybutylene and copolymers of ethylene and propylene can be added to polystyrene. These polymers contain no hydrocarbon-double bonds and are therefore not susceptible to aging like rubber, but the notched-bar impact resistance and the impact strength of polystyrene are only improved to a minor extent by these additions. Due to the insufficient compatibility of these polymers with polystyrene, molded objects of these mixtures have a leafy-fibrous structure, which can be recognized particularly at fractured surfaces.

It has been found that age-resistant and impact-resistant polystyrene and styrene containing copolymers can be produced with advantage by adding a combination of from 0.1 to 20 parts of an amorphous, rubber-like polyolefine and from 1 to 40 parts of a polydiolefine or diolefine-containing elastomer to from 99 to 66 parts of a polystyrene and styrene-containing copolymers. The molded objects produced therefrom show no leafy structure, because the diolefine-containing elastomer produces a better compatibility of the components.

The process is suitable for the production of shock-proof polystyrene and copolymers of styrene with for example, monomers like alpha-methylstyrene, nuclear-methylated styrenes and esters of acrylic- and methacrylic acids, itaconic acid, fumaric acid, maleic acid, acrylnitrile or vinyl acetate.

Suitable amorphous, rubber-like polyolefines are atactic polypropylene, polybutylene and their copolymers, also copolymers of these olefines or olefine mixtures with ethylene, particularly copolymers of ethylene and propylene, which can be produced, for example, in the presence of coordination catalysts, such as combinations of metallo-organic compounds of the metals of group I to III of the periodic system with halogen compounds of the transition metals of group IV to VIII of the periodic system, for example, titanium—or vanadium halides with aluminum triisobutyl.

As polydiolefines or diolefine-containing elastomers are used polybutadiene or polyisoprene, also copolymers of butadiene and vinyl aromatic compounds, such as styrene or unsaturated esters, such as fumaric acid ester, acrylic acid ester, methacrylic acid ester, itaconic acid ester, also natural rubber, but particularly copolymers of 20 to 80 parts of butadiene and 80 to 20 parts styrene.

The composition of the mixtures is preferably so selected that the percentage of rubber-like polyolefine is approximately equal to the content of diolefine in the total mixture. But the notch impact strength can be improved by adding small amounts of the diolefine-containing component, for example 5–10%.

The mixtures can be produced on rolls or in kneaders or extruders. It is also possible to dissolve the additions in styrene and to polymerize this solution. Plasticizers can also be added to the shock-resistant mixtures to improve their workability, as well as pigments and fillers and the known stabilizers against aging.

An advantage of this combination is particularly the low content of double bonds and thus a low tendency to become brittle due to aging. It is known that shock-resistant polystyrenes with a high rubber content become brittle under the influence of light and air to such an extent that the impact- and notch impact strength drops below that of normal polystyrene. Another advantage is the improved impact strength at low temperatures of 0 to —20° C. compared to shock-resistant polystyrenes which contain only rubber.

EXAMPLE 1

(a) On a two roll-mixing mill 75 to 98 parts polystyrene containing 2% butyl sterate, 0 to 15 parts of a copolymer of 40 parts butadiene and 60 parts styrene and 0 to 25 parts of a copolymer of 57 parts ethylene and 43 parts propylene, whose reduced specific viscosity in p-xylene is 2.5 are mixed for 10 minutes at 135° C. The resulting homogenous mixture is ground and injection molded to standard testing rods.

Table 1a

| Polystyrene (parts by weight) | Copolymer of 40 parts butadiene and 60 parts styrene (parts by weight) | Copolymer of 57 parts ethylene and 43 parts propylene (parts by weight) | Impact strength (kg./cm./cm.$^2$) | Notch impact strength (kg./cm./cm.$^2$) |
|---|---|---|---|---|
| 85 | 15 | 0 | 65 | 5.0 |
| 83 | 15 | 2 | 80 | 6.2 |
| 81 | 15 | 4 | 80 | 6.2 |
| 79 | 15 | 6 | 87 | 10.5 |
| 77 | 15 | 8 | 81 | 8.1 |
| 98 | 0 | 2 | 24 | 1.9 |
| 96 | 0 | 4 | 32 | 1.9 |
| 94 | 0 | 6 | 32 | 1.9 |
| 85 | 0 | 15 | 13 | 1.9 |
| 75 | 0 | 25 | Can not be injection molded | |

(b) On a two roll-mixing mill are produced a mixture I of 71 parts polystyrene, 28 parts of a copolymer of 40 parts butadiene and 60 parts styrene and 1 part butyl stearate and a mixture II in which only 24 parts of the butadiene copolymer are used with four parts of ethylene-propylene copolymer, the other components being the same as in mixture I. The rolling and testing was effected as in Example 1a.

Table 1b

|  | Impact strength (kg./cm./cm.$^2$) | | Notch impact strength (kg./cm./cm.$^2$) | |
| --- | --- | --- | --- | --- |
|  | At 20° | At −10° | At 20° | At −10° |
| Mixture I | 84 | 13.8 | 13.6 | 1.7 |
| Mixture II | 84 | 36.0 | 18.0 | 4.0 |

As appears the values for impact strength and notch impact strength are greatly improved, even at low temperatures.

(c) As described under 1a, the mixtures listed in Table 1c were rolled for 20 minutes at 135° C. and tested.

Table 1c

| Polystyrene (parts by weight) | Copolymer of 40 parts butadiene and 60 parts styrene (parts by weight) | Atactic polypropylene (parts by weight) | Butylstearate (parts by weight) | Impact strength (kg./cm./cm.$^2$) | Notch impact strength (kg./cm./cm.$^2$) |
| --- | --- | --- | --- | --- | --- |
| 71 | 28 | 0 | 1 | 70 | 5.6 |
| 63 | 28 | 8 | 1 | 76 | 8.9 |
| 85 | 15 | 0 | 2 | 26 | 3.7 |
| 82 | 15 | 3 | 2 | 63 | 6.7 |

EXAMPLE 2

In the same manner were produced mixtures of 0 to 24 parts of a copolymer of 25 parts by weight butadiene and 75 parts by weight dibutyl fumarate, 70 to 96 parts polystyrene containing 2% butyl stearate, and 0 to 6 parts of a copolymer of 50 parts ethylene and 50 parts propylene, and tested as above.

Table 2

| Polystyrene (parts by weight) | Copolymer of 25 parts butadiene, 75 parts dibutylfumarate (parts by weight) | Copolymer of 57 parts ethylene, 43 parts propylene (parts by weight) | Impact strength (kg./cm./cm.$^2$) | Notch impact strength (kg./cm./cm.$^2$) |
| --- | --- | --- | --- | --- |
| 76 | 24 | --- | 56 | 8.1 |
| 74 | 24 | 2 | 52 | 13.1 |
| 70 | 24 | 6 | 64 | 18.6 |
| 96 | 0 | 6 | 32 | 1.9 |

EXAMPLE 3

A solution of 5 parts by weight of a copolymer of 43 parts ethylene and 57 parts propylene and 2.9 parts by weight of a butadiene/styrene-copolymer, commercially available under the name Plioflex 1006, in 86 parts by weight styrene is heated, after addition of 2 parts by weight ethyl acrylate, 4 parts by weight stearic acid butyl ester and 0.16 parts by weight ditertiary butyl peroxide, as a catalyst, in an aqueous suspension (phase ratio water:organic phase 2:1) with 0.6% polyvinyl alcohol as a suspension stabilizer with stirring for three hours at 110° C., 3 hours at 130° C., and 3 hours at 140° C., whereby a granular polymer (a) is obtained. The latter is compressed on a rolling mill, ground and injection molded to standard testing rods. The measured values compiled in Table 3 show the improvements compared to a polymer without addition of the butadiene-styrene copolymer (c) and a polymer without addition of the copolymer of ethylene and propylene (d).

Table 3

| Polystyrene (parts by weight) | Copolymer of 24 parts butadiene 76 parts of styrene (parts by weight) | Copolymer of 43 parts ethylene 57 parts propylene (parts by weight) | Impact strength (kg./cm./cm.$^2$) | Notch impact strength (kg./cm./cm.$^2$) |
| --- | --- | --- | --- | --- |
| (a) | 2.9 | 5 | 65.1 | 4.0 |
| (b) | 4.3 | 1 | 50.0 | 8.1 |
| (c) | --- | 7 | 15.0 | 2.4 |
| (d) | 4.3 | --- | 34.4 | 2.5 |

EXAMPLE 4

A solution of 3.5 parts by weight of a copolymer of 76% butadiene and 24% styrene, 30 parts by weight acrylonitrile and 1 part by weight of an ethylene/propylene copolymer in 59.5 parts by weight styrene is mixed with 2 parts by weight ethyl acrylate, 4 parts by weight stearic acid butyl ester and 0.16 part by weight ditertiary butyl peroxide, and polymerized as described in Example 3. The polymer after working up has an impact strength of 44 kg. cm./cm.$^2$, a notch impact strength of 6.9 kg. cm./cm.$^2$ and a bending strength of 988 kg./cm.$^2$.

In all instances in the foregoing description, in the absence of any other indication, the word "parts" means "parts by weight."

We claim:

A shock resistant composition comprising, on the basis of 100 parts by weight of the whole composition, from 99 to 66 parts by weight of a material selected from the group consisting of polystyrene and copolymers of styrene with alpha-methylstyrene, nuclear-methylated styrenes, acrylonitrile, vinyl acetate, acrylic acid ester, methacrylic acid ester, itaconic acid ester, fumaric acid ester and maleic acid ester, from 0.1 to 20 parts by weight of an amorphous, rubber-like polyolefine selected from the group consisting of polypropylene, polybutylene, copolymers of propylene and butylene with each other and copolymers of propylene and butylene and mixtures thereof with ethylene and 1 to 40 parts by weight of an elastomer selected from the group consisting of natural rubber, polybutadiene, polyisoprene and copolymers of butadiene with styrene, fumaric acid ester, acrylic acid ester, methacrylic acid ester and itaconic acid ester.

References Cited by the Examiner

UNITED STATES PATENTS

| | | | |
|---|---|---|---|
| 2,436,842 | 3/1948 | Warner et al. | 260—897 |
| 2,616,864 | 11/1952 | Donaldson et al. | 260—878 |
| 2,808,386 | 10/1957 | D'Alelio | 260—892 |
| 2,834,750 | 5/1958 | Salyer et al. | 260—880 |
| 3,014,887 | 12/1961 | Haward | 260—888 |

FOREIGN PATENTS 861,542  2/1961  Great Britain.

OTHER REFERENCES

Natta et al.: Rubber and Plastics Age, vol. 42, pages 53–58, January 1961. (Copy in Scientific Library.)

MURRAY TILLMAN, *Primary Examiner.*

LEON J. BERCOVITZ, *Examiner.*